United States Patent [19]
Misjak

[11] 3,722,940
[45] Mar. 27, 1973

[54] ICE FISH SAVER
[76] Inventor: Sandra M. Misjak, 1410 Calhoun Street, Peru, Ill. 61354
[22] Filed: Aug. 25, 1971
[21] Appl. No.: 174,850

[52] U.S. Cl. ..........................294/1 R, 43/4, 294/19 R
[51] Int. Cl. ..................................................A01k 69/00
[58] Field of Search.........294/19 R, 103, 110 A, 1 R; 43/6.5, 55, 65, 66, 67, 100, 101, 102, 4

[56] References Cited

UNITED STATES PATENTS

| | | | |
|---|---|---|---|
| 2,992,848 | 7/1961 | Livensparger | 294/103 R |
| 681,065 | 8/1901 | Mears | 294/103 R |
| 3,264,028 | 8/1966 | Rasmussen | 294/19 R |
| 3,002,312 | 10/1961 | Barker | 43/100 |

Primary Examiner—Evon C. Blunk
Assistant Examiner—Johnny D. Cherry

[57] ABSTRACT

An accessory for ice fishing and which serves to close a lower end of a hole through the ice when a fish is being pulled up therethrough so to prevent the fish to escape in case it meantime gets off the hook; the device consists of a stationary tube attachable along a side of the hole in the ice, the tube supporting a rod having a handle at its upper end and a horizontal gate plate at its lower end, the rod being pivotable by the handle so as to swing the gate into a closed position at the bottom end of the hole, and the plate then being movable upwardly so to bring the fish into the top end of the hole in the ice.

1 Claim, 2 Drawing Figures

Patented March 27, 1973 3,722,940
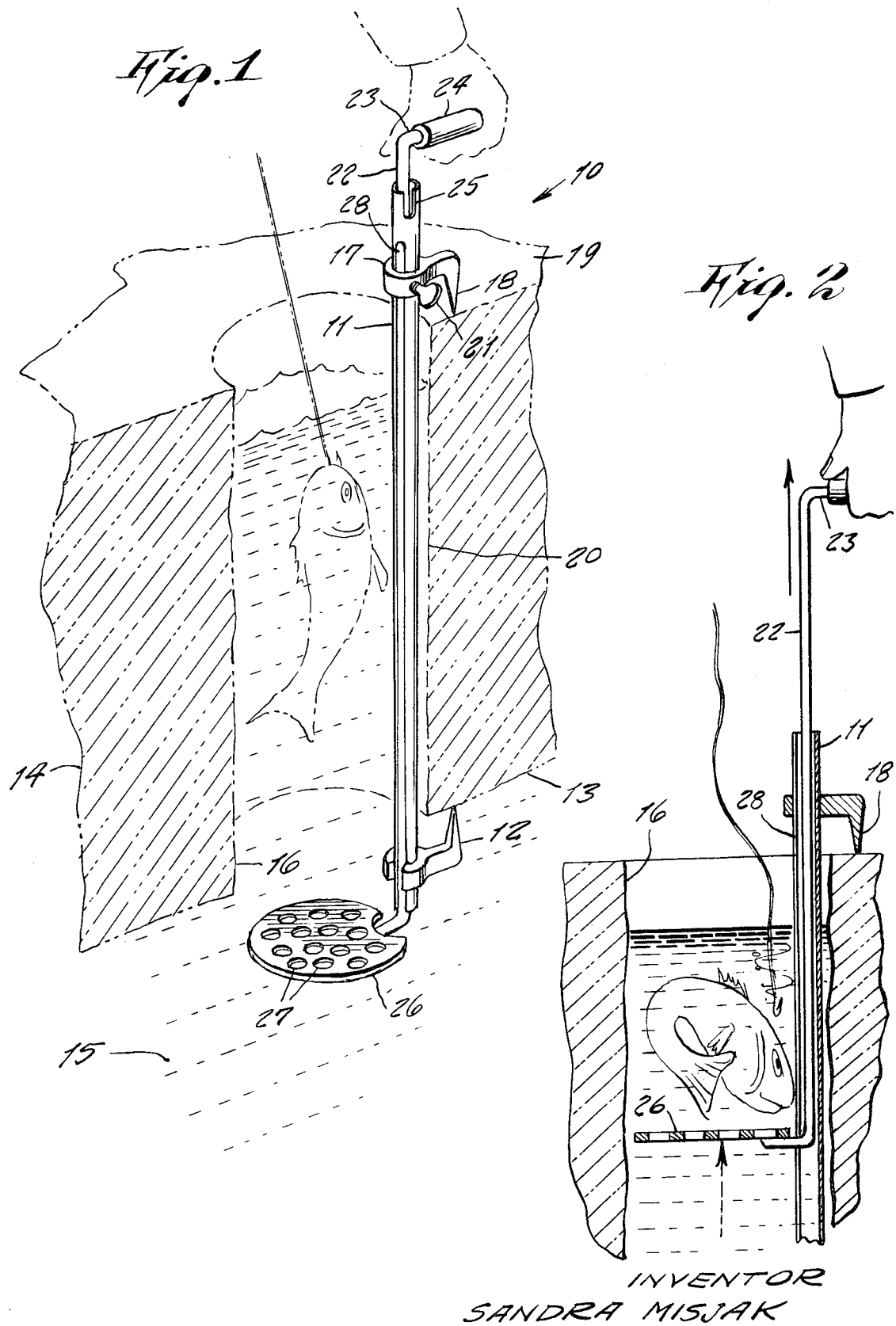
INVENTOR
SANDRA MISJAK

ICE FISH SAVER

This invention relates generally to fishing gear.

It is generally well known to many ice fishermen that sometimes a fish breaks loose from the fish hook while the fish is being pulled through the hole in the ice so that it escapes down back under the ice to freedom. Sometimes a fisherman in attempting to retrieve a released fish plunges his hand (or in the excitement his entire arm) into the hole to grab the fish before he gets away. His hand or arm thus plunged into the water is in danger of freezing, or at best is made uncomfortable by being wet. This situation is objectionable and therefore in want of improvement.

Accordingly, it is a principal object of the present invention to provide a device to prevent a fish to escape out of the ice hole in case it gets free therein.

Another object is to provide an ice fish saver which permits the fisherman to take it slow and easy to retrieve a loose fish in the ice hole.

Another object is to provide an ice fish saver that brings the fish to the upper end of the ice hole so that the fisherman need not wet his hand in the cold water when taking the fish.

Yet another object is to provide an ice fish saver which does not interfere with the normal fishing operation and which is out of the way of the fishing line going through the ice hole.

Yet another object is to provide an ice fish saver which can be quickly and easily set up at an ice fishing hole.

Other objects are to provide an ice fish saver which is simple in design, inexpensive to manufacture, rugged in construction, easy to use, and efficient in operation.

These and other objects will be readily evident upon a study of the following specification and the accompanying drawing, wherein:

FIG. 1 is a perspective view of the invention in use in an ice fishing hole.

FIG. 2 is a fragmentary side view thereof pushing a free fish to the top of the ice hole.

Referring now to the drawing in detail, the reference numeral 10 represents an ice fish saver according to the present invention, wherein there is a ¼ inch diameter tube 11 having a hook 12 secured to a lower end thereof, the hook being upwardly pointed so to grab against the bottom surface 13 of an ice 14 on top of water 15. The tube 11 is accordingly inserted into an ice hole 16 made in the ice 14, the tube being longer than the ice thickness so that an upper protruding end receives a slidable collar 17 having integral downward extending hook 18 for biting into the upper surface 19 of the ice. As shown the tube is placed along a side 20 of the ice hole so to not interfere with normal fishing operation. A wing set screw 21 secures the collar 17 in set position.

A rod 22 of 3/16 diameter extends through the tube, the upper end of the rod forming a handle 23 by being bent at right angle and fitted with a rubber or plastic hand grip 24. A notch 25 on the upper edge of the tube retains the handle 23 when the device is not in use. A lower end of the rod is secured to a horizontal plate 26 having perforated small openings 27 therethrough. When the handle is in the notch, the plate is not aligned with the ice hole 16. A long notch 28 along a side of the tube permits the plate to be lifted upwardly through the ice hole. The plate is of diameter slightly less than the ice hole.

In use, when a fisherman wishes to secure a fish from escaping out of the ice hole, he lifts the handle out of the notch 25, rotates it so to swing the plate into a closed position at the bottom of the ice hole. Then if he lifts the handle, the plate will raise the fish to the top of the hole as shown in FIG. 2.

While various changes may be made in the detail construction, it is understood that such changes will be within the spirit and scope of the present invention as is defined by the appended claims.

I claim:

1. In an ice fish saver, the combination of a tube having an upward extending hook secured to a lower end thereof, an upper end of said tube having a slidable collar with a downward hook, a wing set screw adjustably securing said collar on said tube, and a long slot along a side of said tube, said upward hook being on a diametrically opposite side of said tube to said side having said long slot, a rotatable rod being inserted through said tube, an upper end of said rod being turned at a right angle to form a handle, said handle being fitted with a plastic or rubber hand grip, and said handle being receivable in a shallow notch on an upper edge of said tube, a lower end of said rod being sidewardly turned and secured to a horizontal perforated plate, said sideward lower end of said rod being slidable along said long notch when said plate is upwardly moved by said handle.

* * * * *